United States Patent [19]

Kitagawa

[11] Patent Number: 4,970,476
[45] Date of Patent: Nov. 13, 1990

[54] ELECTRIC NOISE ABSORBER USING A GRANULAR OR LIQUID MAGNETIC SUBSTANCE

[75] Inventor: Hiroji Kitagawa, Nagoya, Japan

[73] Assignee: Kitagawa Industries Company Ltd., Aichi, Japan

[21] Appl. No.: 411,886

[22] Filed: Sep. 22, 1989

[30] Foreign Application Priority Data

Sep. 29, 1988 [JP] Japan ............................ 63-127784[U]

[51] Int. Cl.⁵ ........................ H03H 2/00; H01F 17/06
[52] U.S. Cl. .................................... 333/12; 333/185; 336/175; 336/176; 439/607
[58] Field of Search .................................. 333/12, 185; 336/174–176, 212; 174/36; 439/607, 608, 610; 324/127

[56] References Cited

U.S. PATENT DOCUMENTS

| 4,604,592 | 8/1986 | Pinson | 333/24.1 |
| 4,771,252 | 9/1988 | Morz et al. | 333/24.1 X |
| 4,825,185 | 4/1989 | Matsui | 333/12 X |
| 4,882,561 | 11/1989 | Fujioka | 333/12 X |
| 4,885,559 | 12/1989 | Nakano | 333/12 X |

FOREIGN PATENT DOCUMENTS 63-39997  3/1988  Japan .
2205199  11/1988  United Kingdom .

Primary Examiner—Paul Gensler
Attorney, Agent, or Firm—Oliff & Berridge

[57] ABSTRACT

An electric noise absorber, comprising hollow cases that are shaped so as to surround the periphery of electric cable of an electronic device and are filled with a magnetic substance, such as grain ferrite, which absorbs electric noise on the electric cable. The hollow cases are molded to fit the electric cable and the quantity of magnetic substance is adjusted to reduce as much electric noise as desired. Consequently, the electric noise absorber is made easily and has no extra units.

18 Claims, 4 Drawing Sheets

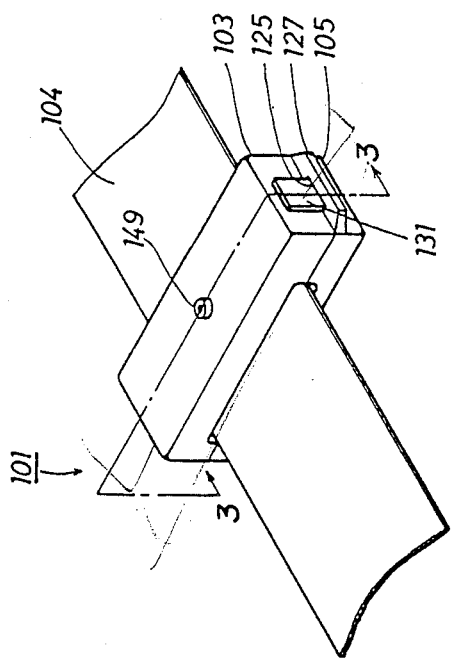
FIG. 4
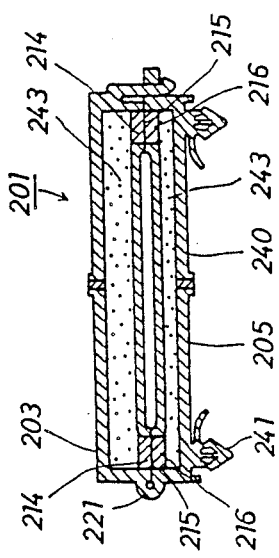
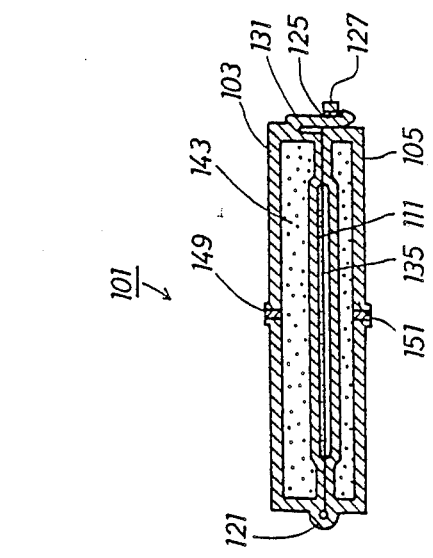
FIG. 3
FIG. 5

4,970,476

ELECTRIC NOISE ABSORBER USING A GRANULAR OR LIQUID MAGNETIC SUBSTANCE

BACKGROUND OF THE INVENTION

This invention relates to an electric noise absorber for absorbing electric noise that is generated within an electronic device or that enters the device from the outside through an electric cable.

As a method for absorbing electric noise, it is well-known that surrounding an electric cable with a magnetic substance, such as ferrite, reduces electric noise on the electric cable. For example, in Japan published unexamined utility model application No. 63-39997, two pieces of half ring-shaped ferrite are accommodated in a case, through which an electric cable passes. In another conventional electric noise absorber, two pieces of half ring-shaped ferrite are fixed to an electric cable with adhesive tape. In the related art devices, the electric noise absorbers can be attached to and detached from electric cables without removing installed cables because the ferrite is divided in two, and these absorbers can be moved to the most effective position to reduce electric noise.

However, these related art electric noise absorbers are large and their installation operations are very tedious.

Fixing ferrite to an electric cable with adhesive tape is inconvenient because installation operations are complicated and the adhesive tape must be removed from and attached to cables again whenever the position of the fixed ferrite needs to be changed.

When two pieces of ferrite are accommodated in a case, an electric cable can be easily fixed between the two pieces of ferrite. However, because the case must contain the ferrite pieces and have elastic units for securing the surfaces of the two ferrite pieces together, the case must be large and its shape complicated.

SUMMARY OF THE INVENTION

It is an object of this invention to provide a small electric noise absorber which can be made without difficulty.

This object is realized by an electric noise absorber of the invention which includes: hollow cases which are shaped so as to surround the periphery of an electric cable of an electronic device, and which are filled with magnetic substance that can absorb electric noise on the electric cable.

Since hollow cases are flexible and the magnetic substance in the cases is fluid, the electric noise absorber of the present invention can be attached to electric cables of any shape and at any position on an electronic device. Hollow cases filled with grain or liquid ferrite are much more convenient than solid ferrite formed in the shape of the hollow cases. Furthermore, hollow cases are easily molded.

This electric noise absorber of the present invention can reduce electric noise above 1 MHz.

BRIEF DESCRIPTION OF THE DRAWINGS

This invention is illustrated diagrammatically in the following drawings wherein:

FIG. 3 is a cross-sectional view of the second embodiment taken on line 3—3 in FIG. 4;

FIG. 4 is a perspective view of the second embodiment;

FIG. 5 is a cross-sectional view of the third embodiment taken on line 3—3 in FIG. 4;

FIG. 11 is another perspective view of the sixth embodiment;

FIG. 12 is also another perspective view of the sixth embodiment;

FIG. 13 is a perspective view of the seventh embodiment.

DETAILED DESCRIPTION OF PREFERRED EMBODIMENTS

Figure 1:
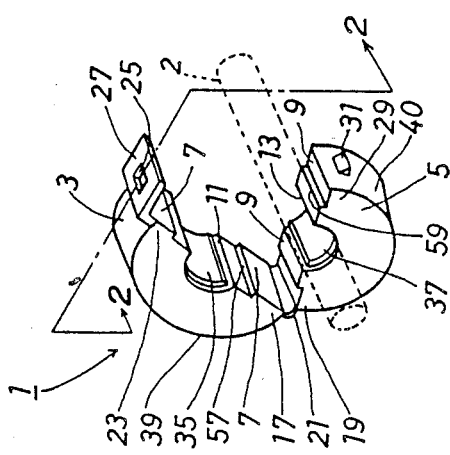
FIG. 1 is a perspective view of an electric noise absorber of the first embodiment of the present invention.

Set forth is an explanation of embodiments of the present invention with reference to the attached drawings FIG. 1 through FIG. 13. As shown in FIG. 1, a perspective view of the first embodiment, an electric noise absorber 1 comprises a first hollow case 3 and a second hollow case 5, which, when closed together, surround an electric cable 2 of an electronic device, and the hollow cases 3 and 5 are filled with a magnetic substance, such as grain or liquid burned ferrite.

Figure 2:
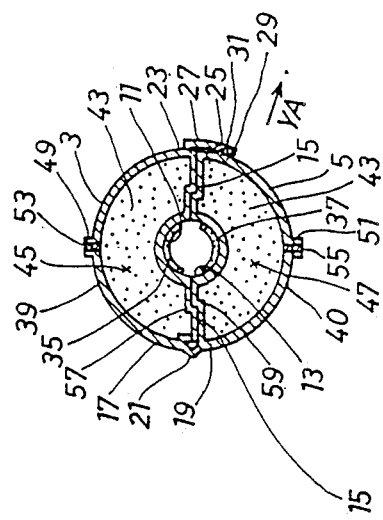
FIG. 2 is a cross-sectional view taken on line 2—2 in FIG. 1.

The first hollow case 3 and the second hollow case 5 are shown in FIG. 1, a perspective view, and in FIG. 2, a cross-sectional view. The hollow cases 3 and 5 can be molded by blowing or a similar process. When contact planes 7 of the first hollow case 3 and contact planes 9 of the second hollow case 5 are closed at contacting part 15, as shown in FIG. 2, respective inner surfaces 11 and 13 of the hollow cases 3 and 5 surround an electric cable 2 of an electronic device and the electric noise absorber 1 is doughnut-shaped.

An end 17 of the first hollow case 3 and an end 19 of the second hollow case 5 are connected by means of a hinge 21, which is integrally formed on the hollow cases 3 and 5. At the other end 23 of the first hollow case 3, a holding member 27 with a hole 25 is formed. The second hollow case 5 has a holding tooth 31 at the other end 29. The holding tooth 31 engages with the hole 25 so that the first hollow case 3 and the second hollow case 5 can be securely closed. In order to detach the holding tooth 31 from the hole 25, the holding member 27 is pulled in the direction indicated by an arrow YA in FIG. 2. Thus, the holding tooth 31 can be easily attached to and detached from the hole 25.

Sheets of foam urethane 35 and 37 are respectively adhered to the inner surface 11 of the first hollow case 3 and the inner surface 13 of the second hollow case 5. These elastic sheets of urethane 35 and 37 are positioned between the hollow cases 3 and 5 and the electric cable 2 and keep the electric cable 2 at a desired position.

At respective outer surfaces 39 and 40 of the first hollow case 3 and the second hollow case 5, openings 49 and 51 are formed. The openings 49 and 51 are closed with closures 53 and 55 after grain ferrite 43 or mixture of ferrite 43 and adhesive is filled in a chamber 45 of the first hollow case 3 and a chamber 47 of the second hollow case 5. The size of the openings 49 and 51 depends on that of the grain ferrite 43.

Steps 57 and 59 are formed at the contact planes 7 of the first hollow case 3 and the contact planes 9 of the second hollow case 5. When the contact planes 7 and 9 are closed, steps 57 and 59 engage with each other and prevent the contact surfaces 7 and 9 from slipping.

The electric noise absorber 1 described above is put around the electric cable 2 in the following fashion. Initially, the two hollow cases 3 and 5 full of grain ferrite 43 are open as shown in FIG. 1. Next, steps 57 and 59 of the contact planes 7 and 9 are engaged with each other. Finally, holding tooth 31 is engaged with hole 25 of the holding member 27. Thus, the electric noise absorber 1 surrounds and holds the electric cable 2.

When the two hollow cases 3 and 5 are closed such that they surround the electric cable 2, electric noise absorber 1 effectively absorbs electric noise on an electric cable. Furthermore, the electric noise absorber 1 is only slightly bigger than the ferrite. The quantity of the grain ferrite can be adjusted to reduce as much electric noise as desired. Thus, the electric noise absorber is easy to operate and as small as possible.

Regarding the magnetic substance, either hard or soft ferrite can be used. Further, plastic magnet or synthetic rubber magnet or the like, which is made by mixing magnetic ferrite powder with plastic or rubber or the like, can also be placed in the hollow cases so that grain ferrite 43 cannot move in the hollow cases 3 and 5.

The second embodiment is shown in FIGS. 3 and 4. An electric noise absorber 101 absorbs electric noise on flat cable 104, as shown in FIG. 4, a perspective view. A first hollow case 103 and a second hollow case 105, which are filled with grain ferrite 143, surround the flat cable 104.

As shown in FIG. 3, a cross-sectional view of FIG. 4, a first hollow case 103 and a second hollow case 105 are connected by means of a hinge 121 at one end, and at the other end a holding tooth 131 engages with a hole 125 in a holding member 127. Grain ferrite 143 is inserted into hollow cases 103 and 105 through openings 149 and 151. To an inner surface 111 of the first hollow case 103, a sheet of foam urethane 135 is adhered in order to keep the flat cable 104 in position.

Thus, the electric noise absorber 101 can be easily attached to and detached from the flat cable 104 and absorbs electric noise on the flat cable 104.

The third embodiment, shown in FIG. 5, a cross-sectional view of FIG. 4, is a variation of the electric noise absorber 101 in FIGS. 3 and 4.

An electric noise absorber 201 comprises a first hollow case 203 and a second hollow case 205, which are connected by means of a hinge 221 and filed with grain ferrite 243. At contacting parts 215, where the first hollow case 203 and the second hollow case 205 are closed, partition plates 214 and 216 made of ferrite are attached so as to keep the ferrite in the hollow cases 203 and 205 and reduce magnetic resistance. Fixtures 241 are formed on the outer surface 240 of the second hollow case 205. The fixtures 241 are inserted into and securely fixed to a component of an electronic device.

An electric noise absorber 301 of the fourth embodiment is explained with reference to FIGS. 6 and 7. A first hollow case 303 and a second hollow case 305 can be separated completely and contact planes 307 of the first hollow case 303 and contact planes 309 of the second hollow case 305 are larger than cross sectional areas of the other places in order to lessen magnetic resistance. As shown in FIG. 7, where contact planes 307 and 309 are closed, the two hollow cases 303 and 305 are full of grain ferrite 343.

The first hollow case 303 has two holding members 327 with holes 325 at its ends 317 and 323, and the second hollow case 305 has holding teeth 331 at its ends 319 and 329. The holding teeth 331 engage with the holes 325. On the respective outer surfaces 339 and 340 of the two hollow cases 303 and 305, openings 349 and 351 are formed. Grain ferrite 343 is inserted into the hollow cases 303 and 305 through openings 349 and 351. On inner surfaces 311 and 313 of the hollow cases 303 and 305, several holding projections 310 and 312 are attached.

Figure 6:
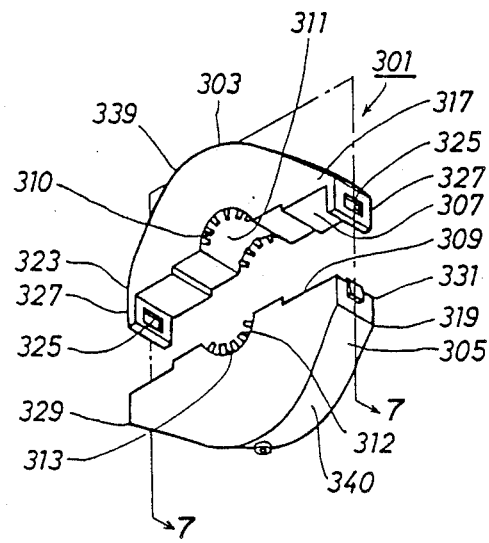
FIG. 6 is a perspective view of the fourth embodiment.
Figure 7:
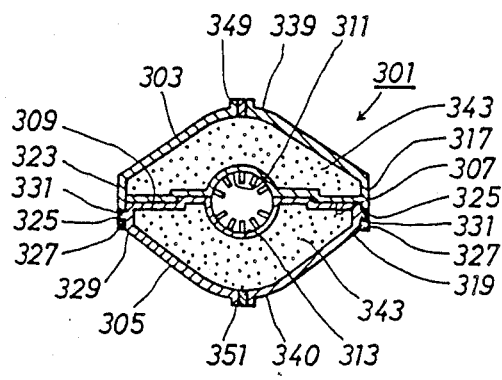
FIG. 7 is a cross-sectional view taken on line 7—7 in FIG. 6.
Figure 9:
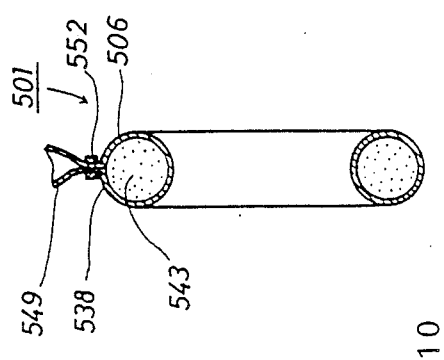
FIG. 9 is a cross-sectional view of the sixth embodiment taken on line 9—9 in FIG. 10.
Figure 10:
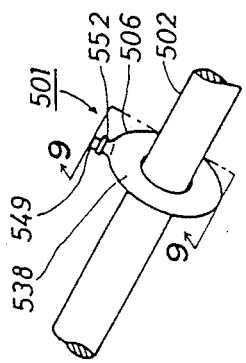
FIG. 10 is a perspective view of the sixth embodiment.

First, the electric noise absorber 301 in its open state is put around an electric cable, as shown in FIG. 6, and contact planes 307 and 309 are closed. Then the holding teeth 331 engage with the holes 325. Thus, the electric noise absorber 301 surrounds the electric cable, and the grain ferrite 343 in the hollow cases 303 and 305 reduces electric noise on the electric cable. The holding projections 310 and 312, which are positioned between the electric cable and the hollow cases 303 and 305, hold the electric cable at a desired position.

Figure 8:
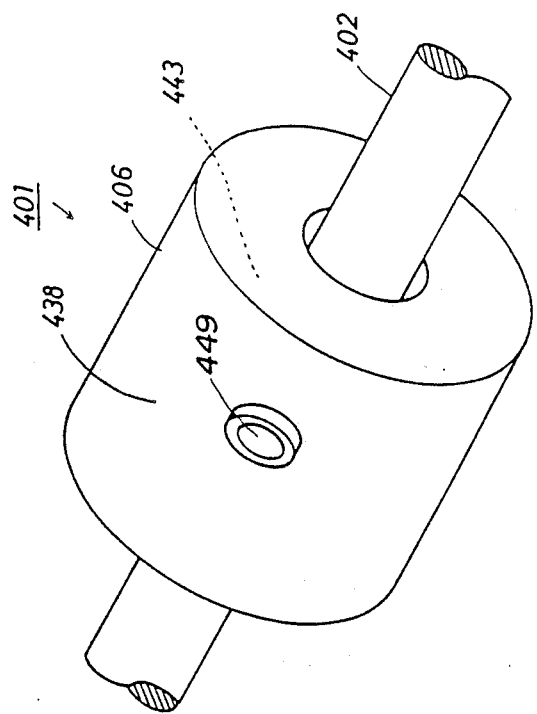
FIG. 8 is a perspective view of the fifth embodiment.

An electric noise absorber 401 shown in FIG. 8 has a plastic hollow case 406 which surrounds electric cable 402. Grain ferrite 443 is inserted through an opening 449 on an outer surface 438 of the hollow case 406 and absorbs electric noise on the electric cable 402.

An electric noise absorber 501 of the sixth embodiment is depicted in FIGS. 9 through 12. A ring-shaped hollow case 506 is made of rubber and is filled with grain ferrite 543. After the grain ferrite 543 is inserted through an opening 549 on an outer surface 538 of the hollow case 506, the opening 549 is closed with a clasp 552. Since the hollow case 506 is made of elastic rubber and the ferrite 543 is granular, the electric noise absorber 501 may take various shapes and surround more than two electric cables; for example, in FIG. 11 electric noise absorber 501 is extended and wound around two electric cables, and in FIG. 12 it is wound around an electric cable twice. In this manner, electric noise absorber 501 can fit any kind of electric cable.

An electric noise absorber 601 (see FIG. 13) of the seventh embodiment is made of rubber rings connected to each other so as to absorb electric noise on two electric cables 602. Number and shape of electric noise absorber 601 can be chosen according to those of electric cables.

It should be understood that this invention is not limited to the embodiment illustrated and described, but that in its broadest aspects it includes all equivalent embodiments and modifications that come within the scope of the claims.

What is claimed is:

1. An electric noise absorber for absorbing noise on an electric cord comprising:
   a magnetic substance chosen from the group consisting of granular and liquid magnetic substances; and
   a closed containing means formed to surround the cord for containing the magnetic substance.

2. The electric noise absorber of claim 1, wherein the containing means is a hollow ring of flexible material.

3. The electric noise absorber of claim 1, wherein an opening is formed in the containing means for introducing the magnetic substance into the containing means.

4. The electric noise absorber of claim 3, wherein the opening may be selectively closed.

5. The electric noise absorber of claim 1, wherein the magnetic substance is ferrite.

6. The electric noise absorber of claim 1, wherein the containing means comprises two connected hollow rings of flexible material.

7. The electric noise absorber of claim 1, wherein securing means are attached to the containing means for securing the noise absorber to a surface.

8. The electric noise absorber of claim 1, wherein the containing means comprises two closed containers that contact each other at two contacts such that they surround the cord.

9. The electric noise absorber of claim 8, wherein
the closed containers contact each other at first and second contacts;
a hinge rotatably attaches the closed container at the first contact; and
a locking means selectively interlocks the two containers at the second contact.

10. The electric noise absorber of claim 9, wherein the locking means comprises a perforated tab attached to one container and a projection on the other container for engaging the perforated tab.

11. The electric noise absorber of claim 8, wherein the two containers each have an opening for introducing the magnetic substance.

12. The electric noise absorber of claim 11, wherein the openings may be selectively closed.

13. The electric noise absorber of claim 8, wherein, at each contact, one container has an indentation and the other container has a projection for engaging the indentation.

14. The electric noise absorber of claim 8, wherein the containers have contacting inner surfaces, with a groove formed on at least one of the inner surfaces for receiving the cord.

15. The electric noise absorber of claim 14, wherein holding means are attached to the at least one groove for holding the cord in position.

16. The electric noise absorber of claim 8, wherein locking means are attached at each contact for selectively interlocking the two containers.

17. The electric noise absorber of claim 8, wherein:
the containers have contacting inner surfaces;
grooves are formed on the inner surfaces for receiving the cord; and
holding means are attached to the grooves for holding the cord in position.

18. The electric noise absorber of claim 17, wherein the holding means are a plurality of flexible projections.

* * * * *